United States Patent
Sobe et al.

(10) Patent No.: US 6,738,132 B2
(45) Date of Patent: May 18, 2004

(54) METHOD AND APPARATUS FOR MEASURING RAMAN GAIN, METHOD AND APPARATUS FOR CONTROLLING RAMAN GAIN, AND RAMAN AMPLIFIER

(75) Inventors: Masaaki Sobe, Tokyo (JP); Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/107,392

(22) Filed: Mar. 28, 2002

(65) Prior Publication Data

US 2002/0140927 A1 Oct. 3, 2002

(30) Foreign Application Priority Data

Apr. 2, 2001 (JP) ........................................ 2001-103070

(51) Int. Cl.[7] ................................................. G01N 21/00
(52) U.S. Cl. ..................................................... 356/73.1
(58) Field of Search ...................... 356/73.1; 385/12–24, 385/37; 398/9–38; 359/110, 334, 124, 133, 134, 151, 160, 174, 176, 337

(56) References Cited

U.S. PATENT DOCUMENTS 6,081,323 A    6/2000  Mahgerefteh et al.
6,452,716 B1 *  9/2002  Park et al. .................. 359/334
6,519,026 B1 *  2/2003  Holland ..................... 356/73.1
2002/0097481 A1 *  7/2002  Du et al. .................... 359/334
2002/0118442 A1 *  8/2002  Ghera et al. ................ 359/334

FOREIGN PATENT DOCUMENTS

| JP | 7-311120 | 11/1995 |
| JP | 9-230399 | 9/1997 |
| JP | 2002-202224 | 7/2002 |
| JP | 2002-250674 | 9/2002 |

* cited by examiner

Primary Examiner—Tu T. Nguyen
(74) Attorney, Agent, or Firm—Young & Thompson

(57) ABSTRACT

A Raman amplifier of the present invention includes a loss measuring unit (110) for measuring loss distribution of an object of measurement by means of OTDR based on reflected light with respect to outputted test light; an optical coupler (114) in which the test light is supplied to a first input terminal thereof and one of output terminals thereof is connected to an optical fiber transmission line; a wavelength filter (116) inserted between the loss measuring unit (110) and the optical coupler (114); a control circuit (200) for generating a control signal for reducing an error signal obtained by comparing a Raman gain obtained with a reference value; and an excitation light source (140) for changing an excitation light power based on the control signal.

2 Claims, 9 Drawing Sheets

METHOD AND APPARATUS FOR MEASURING RAMAN GAIN, METHOD AND APPARATUS FOR CONTROLLING RAMAN GAIN, AND RAMAN AMPLIFIER

BACKGROUND OF THE INVENTION

1. Field of the Invention

The present invention relates to a method and apparatus for measuring a Raman gain, a method and apparatus for controlling a Raman gain and a Raman amplifier, which are used in optical communications and the like. Particularly, the present invention relates to a method for measuring a Raman gain, which is capable of measuring a Raman gain at one end of an optical fiber transmission line, and an apparatus thereof, to a method and apparatus for controlling a Raman gain and to a Raman amplifier.

2. Description of Related Art

Along with exploitation of wavelength bands utilizing low-loss optical fibers and low-loss wavelength bands and with development of amplification technologies, prolongation of optical fiber transmissions has been advancing these days. To perform more efficient transmissions at lower costs, it is expected, in the future, to realize non-relay transmissions with low losses. For the non-relay transmission, conceived is application of an optical fiber amplifier, for example, an erbium-doped fiber optical amplifier (EDFA), which takes an optical fiber transmission line itself as an amplifying medium, or application of a broadband optical amplification technology.

In a communication system using such an optical fiber transmission line, progress has been made in development which aims at commercialization of a distributed Raman amplification (DRA) technology.

Raman amplification is a phenomenon in which signal light is amplified, the Raman amplification being operated in the following manner. Specifically, when signal light and excitation light having a frequency higher than that of the signal light by about 13 THz are simultaneously inputted to an optical fiber made of silica glass, an energy of the excitation light is partially transferred to the signal light due to a stimulated Raman scattering phenomenon generated in the silica glass, whereby the signal light is amplified. A gain obtained by the Raman amplification is hereinafter referred to as a Raman gain. Actually, the Raman gain has wavelength dependency (Raman gain profile), as shown in FIG. 1, which has its peak at a wavelength having a frequency lower than that of the excitation light by 13 THz.

In addition, the distributed Raman amplification (DRA) is a form of obtaining a Raman amplification effect by taking an optical fiber transmission line itself as an amplifying medium. The DRA is realized by inputting excitation light to the optical fiber transmission line. In an optical fiber transmission system applied with the DRA, a transmittable distance can be extended because a propagation loss of the transmission line is compensated with the Raman amplification.

In an optical transmission system corresponding to the foregoing long-distance transmission, it is necessary to maintain a power of signal light which incurs a certain loss via the optical fiber transmission line at a desired level at a receiving side. Conventionally, an input level of the transmitted signal light has been measured at the receiving side, thereby adjusting a signal light power at a transmitting side or an amplification factor in a relay transmission line.

Description will be made hereinafter for a measuring method in a conventional optical transmission system. Here, for adjustment of the input level of the foregoing signal light, a gain efficiency of an optical fiber is particularly used. The gain efficiency is a parameter for each fiber, indicating how much gain can be obtained at a measuring point of the receiving side with respect to a power 1 W of a transmitting light source. In other words, when excitation light of 1 W is inputted to an amplifying medium, a Raman gain (dB) received by signal light propagating through the amplifying medium is called a Raman gain efficiency (dB/W). The Raman gain efficiency is different in each individual fiber. The reason for the difference in the Raman gain efficiency is that the Raman gain efficiency is influenced by such factors as a mode field diameter, an additive amount of $GeO_2$, and absorption of water (OH), and that the above factors are different, respectively, for a type of the fiber, a manufacturer, time of manufacture and a lot. Furthermore, the Raman gain efficiency also fluctuates depending on a state at the scene, such as loss characteristics in a relay station. Thus, to control the amplification gain particularly in the distributed Raman amplification in the optical fiber transmission system using installed optical fiber transmission lines, it is necessary to measure the Raman gain efficiency.

In an attempt to measure the Raman gain efficiency, it was conventionally necessary to conduct an operation therefor by disposing measuring instruments, light sources and operators at both ends of the transmission line. In other words, it was necessary to operate a test light source disposed at one end of an installed fiber and a photodetector disposed at the other end thereof in conjunction with each other. In addition, because a manual operation was conducted by a maintenance worker going into the relay station to perform measurement, a procedure was required, that is, adjustment of a measurement timing, personnel deployment to the relay station, relocation of measuring instruments were required. As described above, because of difficulties in workability, there was a demand for means of measuring the gain efficiency only by an operation at one end of the transmission line.

Moreover, when, with respect to excitation wavelengths of plural types, Raman gain efficiencies of desired wavelengths are required to be obtained, respectively, different test lights having wavelengths of the same number as that of the types of the excitation wavelengths were necessary, thereby causing problems concerning costs, versatility and the like.

SUMMARY OF THE INVENTION

An object of the present invention is to enable measurement of a Raman gain only by an operation therefor at one end of a transmission line.

A method of measuring a Raman gain of the present invention is one for measuring a Raman amplification gain of an optical fiber transmission line, which includes the following two steps: a measurement step of measuring a propagation loss of the optical fiber transmission line in cases of presence and non-presence of excitation light to the optical fiber transmission line by means of optical time domain reflectometry (ODOR); and a calculation step of calculating the Raman gain of the optical fiber transmission line based on a ratio of the propagation loss in the above two cases.

A method of controlling a Raman gain of the present invention is one for controlling a Raman amplification gain of an optical fiber transmission line, which includes the following two steps: a measurement step of measuring the Raman gain of the optical fiber transmission line; and a control step of generating a control signal for reducing an error signal which is a result obtained by comparing the Raman gain with a control target, the measurement step including a procedure of the foregoing method of measuring a Raman gain.

A Raman gain measuring apparatus of the present invention is one for measuring a Raman gain of an optical fiber transmission line, in which provided are: a loss measuring unit for measuring loss distribution of an object of measurement by means of OTDR based on reflected light with respect to outputted test light; and an optical coupler in which the test light is supplied to a first input terminal thereof and one of output terminals thereof is connected to the optical fiber transmission line.

A Raman gain controlling apparatus of the present invention is one for controlling a Raman gain of an optical fiber transmission line, in which provided are: the foregoing Raman gain measuring apparatus; and a control circuit for generating a control signal for reducing an error signal obtained by comparing the Raman gain obtained in the Raman gain measuring apparatus with a reference value.

A Raman amplifier of the present invention is one for subjecting an optical fiber transmission line to Raman amplification, which is provided with the foregoing Raman gain controlling apparatus and an excitation light source for changing an excitation light power based on a control signal.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First, before describing a method and apparatus for measuring a Raman gain, a method and apparatus for controlling a Raman gain and a Raman amplifier of the present invention, a conventional constitution thereof will be described to facilitate understanding of the present invention.

Figure 2:
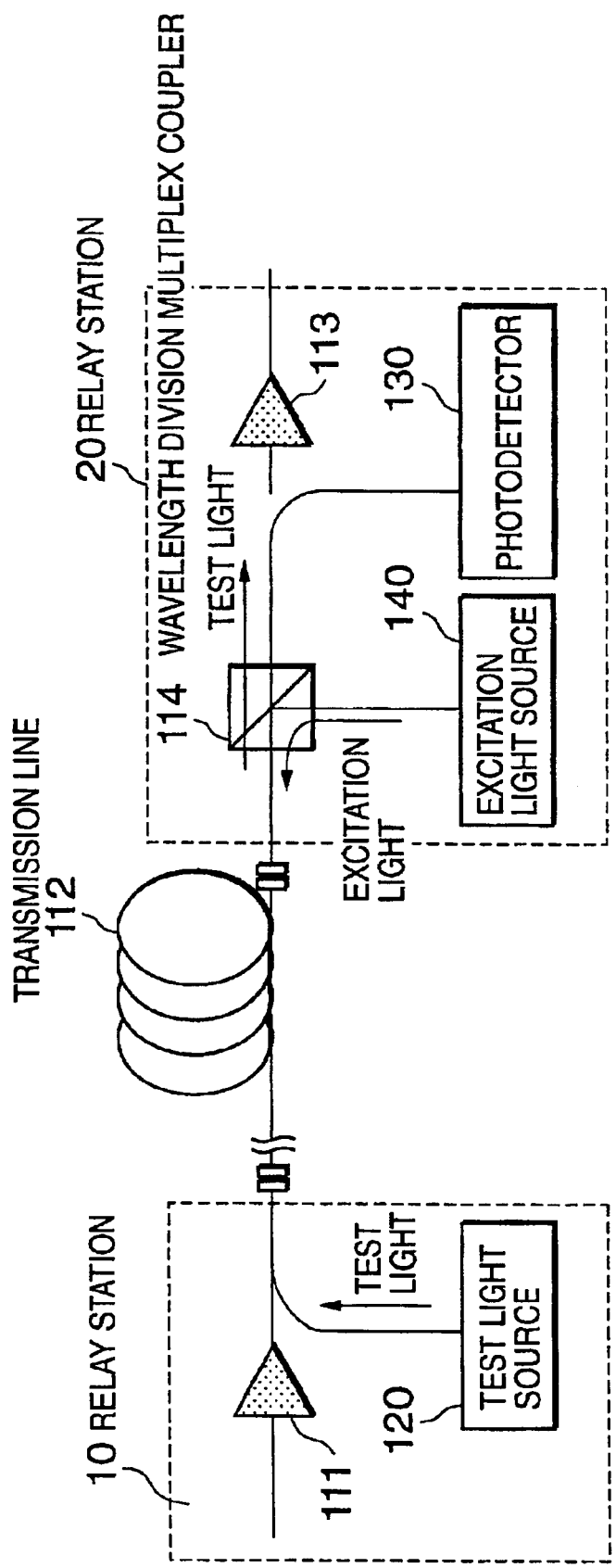
FIG. 2 is a constitutional view showing a conventional apparatus for measuring a Raman gain.

Measurement of a Raman gain efficiency of distributed Raman amplification has been conventionally conducted with a constitution as shown in FIG. 2. In the constitution of FIG. 2, provided are a test light source 120 at one end of a transmission line and a wavelength division multiplex (WDM) coupler 114 at the other end thereof, for multiplexing/demultiplexing excitation light and test light. An excitation light source 140 is connected to an excitation light wavelength band port of the WDM coupler 114, and a photodetector 130 for measuring a test light power is connected to a test light wavelength band port thereof. For the photodetector 130, for example, an optical spectrum analyzer, an optical power meter and the like are used. By inputting the test light to the transmission line, a test light power (called P1) detected by the photodetector in a state of stopping an output of the excitation light source is measured. Next, a test light power (called P2) detected by the photodetector in a state of releasing the output of the excitation light source is measured. A ratio of P2 and P1 gives a Raman gain with respect to the test light. A ratio of the Raman gain and the excitation light output power is a Raman gain efficiency.

When using the conventional constitution, for example, it is necessary to operate a test light source 120 disposed at one end of an installed fiber with a relay interval stretching over 80 km and a photodetector 130 disposed at the other end thereof in conjunction with each other. In addition, because a manual operation was conducted by a maintenance worker going into a relay station to perform measurement, adjustment of a measurement timing, personnel deployment to the relay station, relocation of measuring instruments were required. Moreover, there was a problem that an operational mode for each communication common carrier sets a limitation to measurable positions, making flexible setting of a measurement interval impossible.

In the foregoing conventional constitution, when obtaining Raman gain efficiencies in respective desired wavelengths with respect to plural types of excitation wavelengths, the same number of test lights having different wavelengths as that of the types of the excitation wavelengths were required. Thus, rising of costs and lowering of versatility were inevitable.

Next, description will be made for embodiments of the present invention by using the drawings.

First Embodiment

Figure 3:
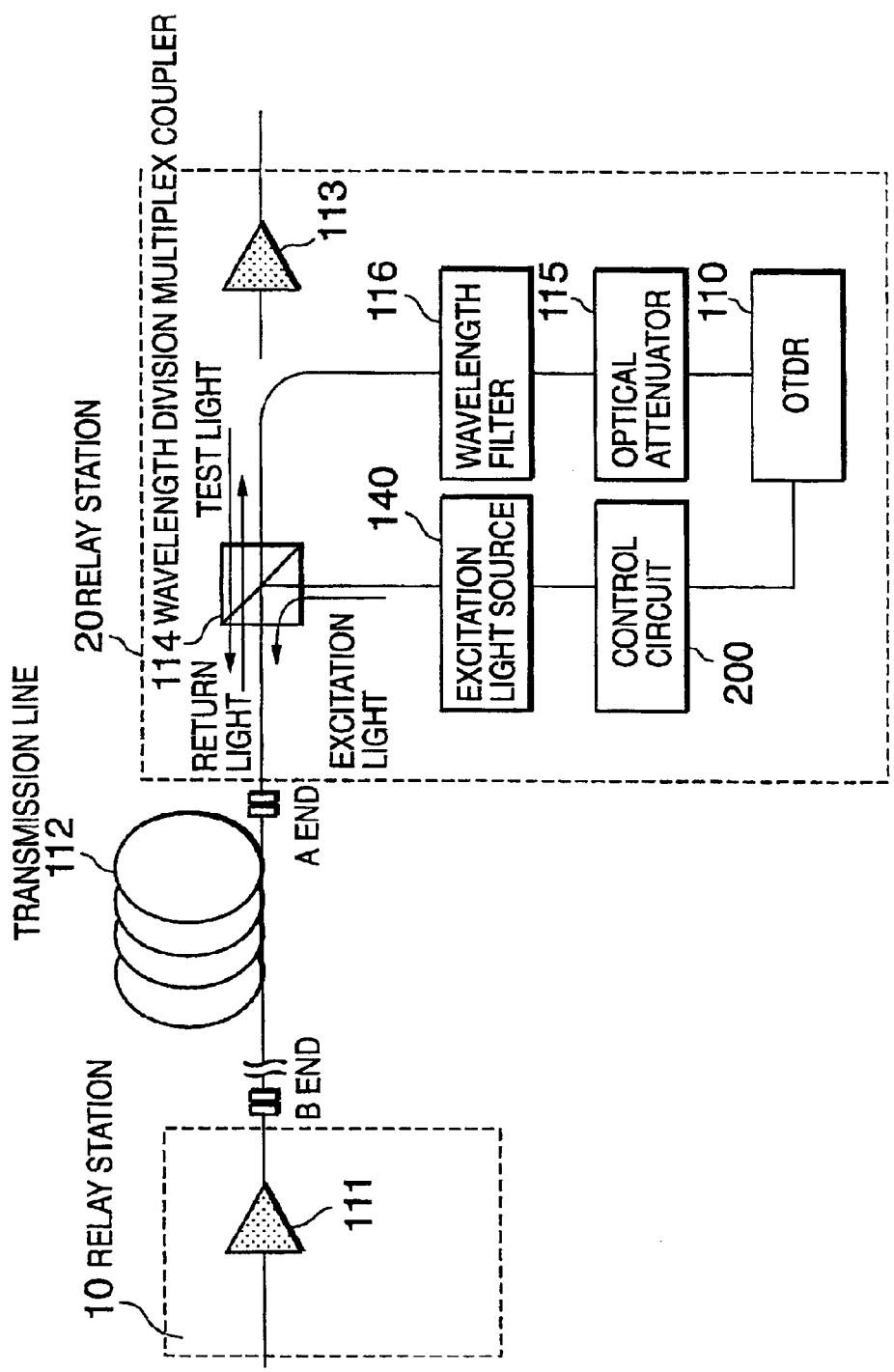
FIG. 3 is a constitutional view showing an apparatus for measuring a Raman gain and a Raman gain efficiency of the present invention.

FIG. 3 is a constitutional view showing a constitution of a first embodiment of the present invention. In the constitution of FIG. 3, a WDM coupler 114 for multiplexing/demultiplexing an excitation light wavelength and a test light wavelength is connected to one end of a transmission line. An excitation light source 140 is provided in an excitation light wavelength port of the WDM coupler 114; and a wavelength filter 116, an optical attenuator 115 and an OTDR device 110 are serially connected in this order to a test light wavelength port thereof. In FIG. 3, a Raman gain is measured by use of the wavelength filter 116, the optical attenuator 115, the OTDR device 110 and the WDM coupler 114.

In the embodiment, measurement of a Raman gain efficiency is conducted by use of the optical time-domain reflectometry (OTDR) device 110.

OTDR is a technique for measuring distributed losses in an optical fiber transmission line by making pulsed light incident from one end of the optical fiber transmission line and by measuring return light attributable to back scattering caused in the optical fiber transmission line in a time-shared manner. Because a pulsed light power to be detected reciprocates between an incident end and a reflection point, a half of an attenuation amount of the reciprocative amount to an attenuation amount of a one-way trip therebetween.

Figure 1:
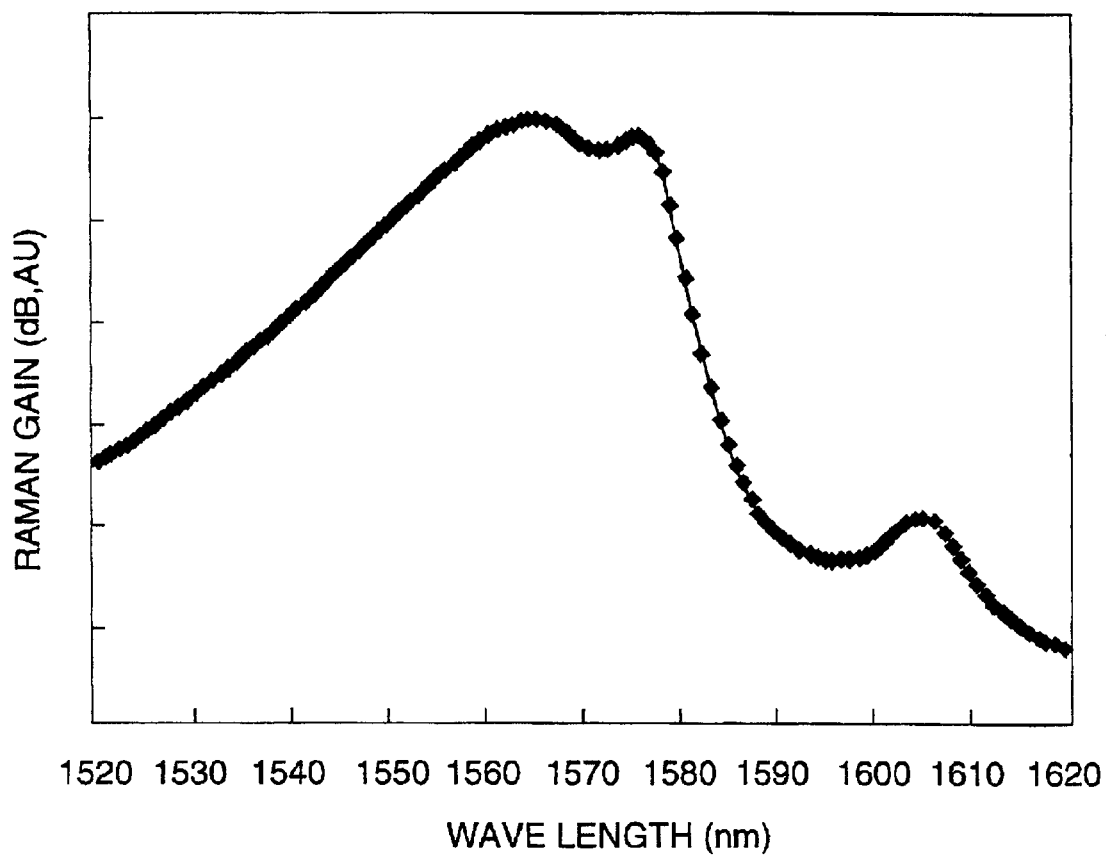
FIG. 1 is a graph showing a Raman gain profile.
Figure 11:
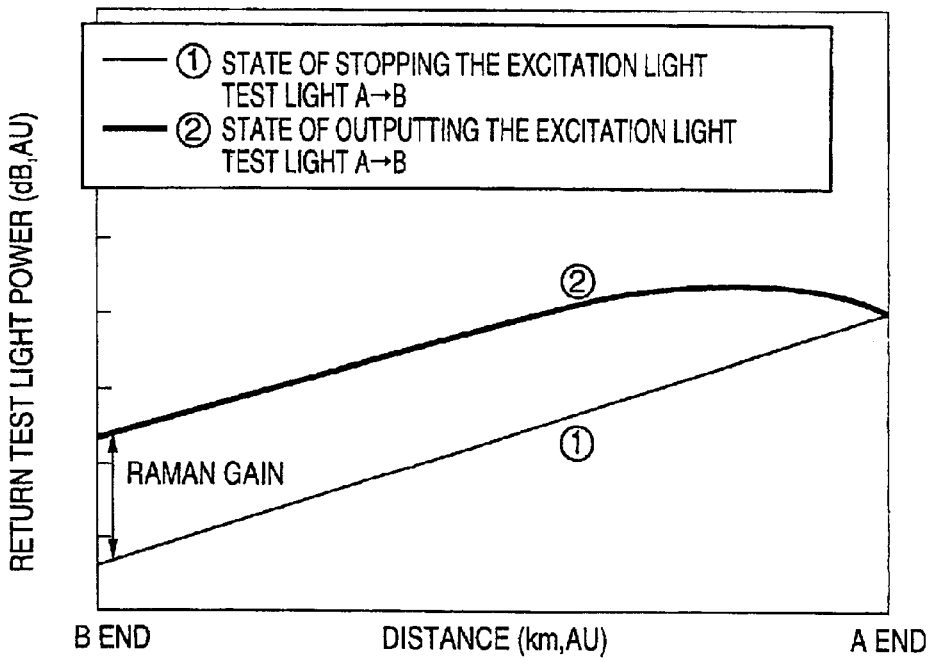
FIG. 11 is a graph showing transition of a test light power in a transmission line, indicating an operation of the present invention.
Figure 12:
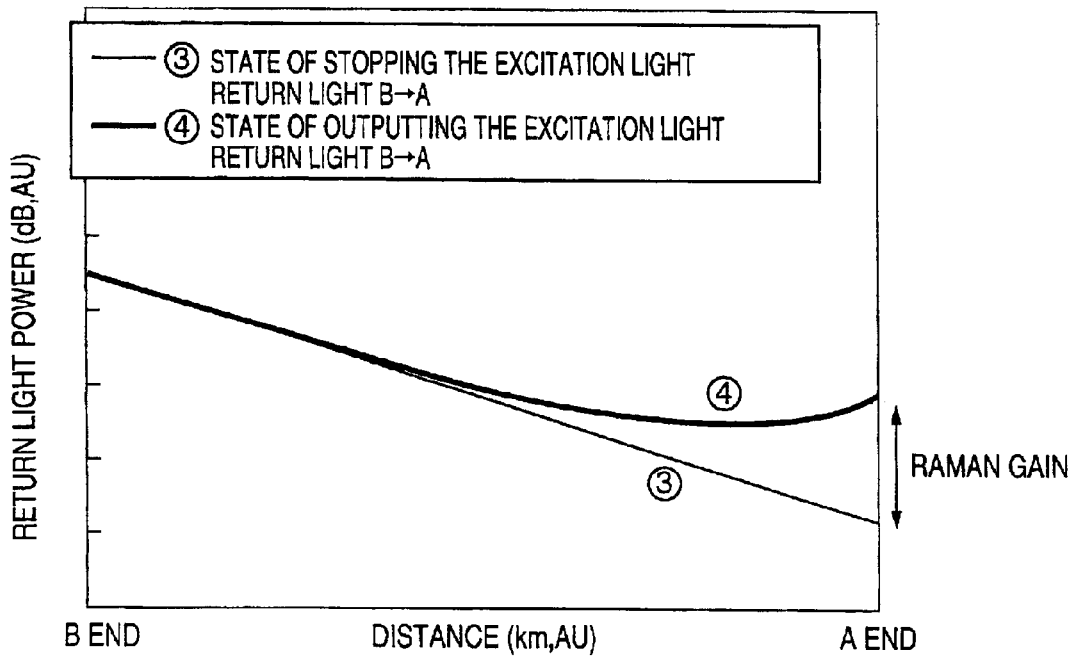
FIG. 12 is a graph showing transition of a return light power in the transmission line, indicating the operation of the present invention.

FIG. 11 shows a state where pulsed light inputted from A end of an optical fiber transmission line 112 reaches short of the vicinity of B end while attenuating. FIG. 12 shows a state where return light generated in short of the vicinity of B end reaches A end while attenuating. A reduction amount of losses, obtained by inputting excitation light, is considered to be a Raman gain. As shown in FIG. 11 and FIG. 12, this Raman gain (refer to FIG. 1) is the sum of a Raman gain (refer to FIG. 12) received by the test light while propagating in the same direction as the excitation light until reaching short of the vicinity of B end, and a Raman gain received by the return light while propagating in the reverse direction to the excitation light until reaching A end. A propagation loss (dB) detected from the return light generated in short of the vicinity of B end of the transmission line is set as L1, OTDR measurement is conducted therefor in a state of outputting the excitation light, and a propagation loss (dB) detected from the return light generated in short of the vicinity of B end of the transmission line is set as L2. Because the magnitude of the Raman gain is not dependent on propagation directions of the test light (return light) and the excitation light, a half of a value obtained by subtracting L1 from L2 is the Raman value obtained by the test light in the transmission line. By dividing the Raman gain by an excitation light output power, a Raman gain efficiency (dB/W) in an OTDR pulsed light wavelength can be calculated.

Figure 4A:
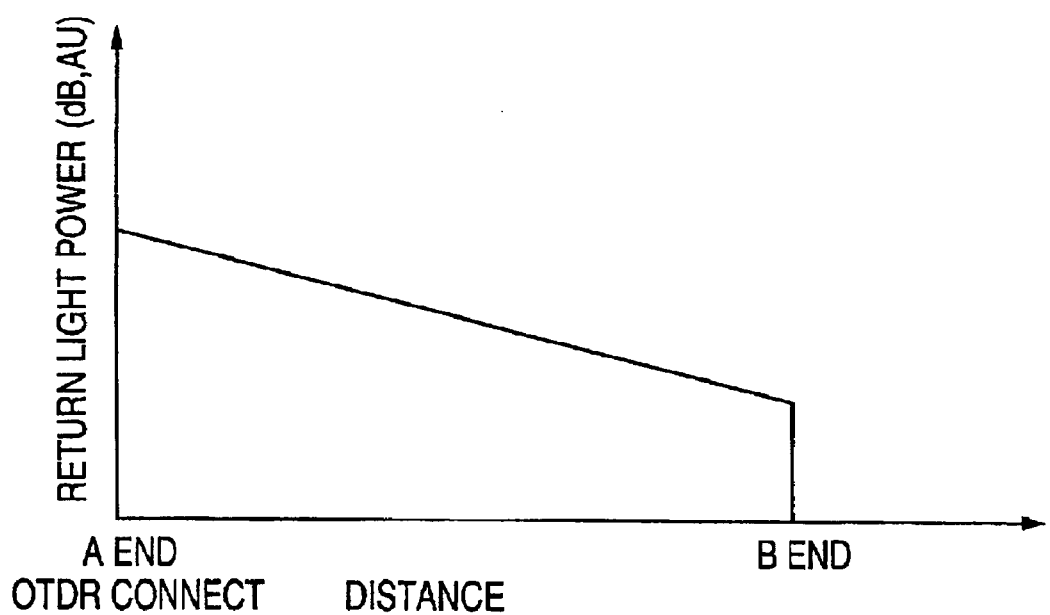
FIGS. 4(a) and 4(b) are views explaining characteristics of transmission line ends in OTDR graphs, where FIG. 4(a) indicates the case where B end is subjected to reflectionless termination and FIG. 4b) indicates the case where reflection is generated at B end.
Figure 4B:
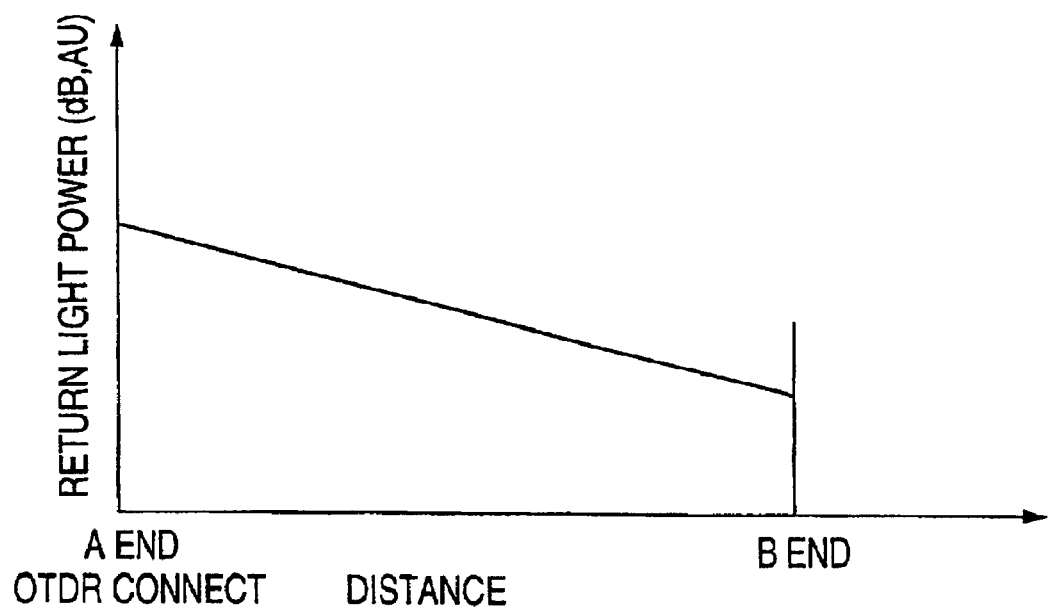

As factors for generation of the return light, there are Fresnel reflection caused at a connection point or end point of a fiber and Rayleigh scattering continuously caused in an optical fiber. As shown in FIG. 3, hereinafter, one end of the transmission line, connected to the OTDR device, is set as A end, and the other end thereof is set as B end. Graphs of FIGS. 4(a) and 4(b) respectively show return light powers measured by OTDR. The horizontal axis in each of the graphs represents a distance between A end and a point where the return light is generated. Hereinafter, such a graph will be called an OTDR graph. In FIGS. 4(a) and 4(b), return light is not generated in the transmission line excluding B end, except for return light caused by Rayleigh scattering. FIG. 4(a) shows the case where B end is subjected to reflectionless termination by use of an isolator and the like. In the graph, the return light power generated by Rayleigh scattering comes to zero concurrently with the end of the fiber. FIG. 4(b) shows the case of occurrence of Fresnel reflection due to discontinuity of the fiber at B end or the like. A large reflection is generated at the end of the fiber, and the return light caused by Rayleigh scattering comes to zero thereafter. When the transmission line is measured by OTDR, the OTDR graph shows characteristics as shown in FIG. 4(a) or FIG. 4(b) at B end. Accordingly, such characteristics enable determination of the distance between A end and B end as well as measurement of a loss received by the pulsed light propagated short of the vicinity of B end from A end.

In the embodiment, a spectral width of OTDR pulsed light to be test light is particularly set to 1 nm. By setting a passband of an optical filter for taking out a test light wavelength to 1 nm, an amplified spontaneous emission (ASE) amplified by Raman amplification is removed, preventing saturation of a photodetector of the OTDR device attributable to the ASE. Moreover, an attenuation amount of the optical attenuator is adjusted, so that the photodetector of the OTDR device is not saturated and the return light generated in short of the vicinity of B end can be measured with good sensitivity.

Next, description will be made for a measurement procedure. First, the OTDR measurement is conducted in a state of stopping the excitation light output, thereby obtaining a propagation loss (dB) (called L1) detected from the return light generated in short of the vicinity of Bend of transmission line. Then, the OTDR measurement is conducted in a state of outputting the excitation light, thereby obtaining a propagation loss (dB) (called L2) detected from the return light generated in short of the vicinity of B end of the transmission line. A Raman gain is obtained by subtracting L1 from L2, and by dividing this Raman gain by the excitation light power, a Raman gain efficiency is obtained.

However, the significant attenuation of the excitation light power at B end leads to generation of no Raman gain. In other words, the OTDR graphs in the state of stopping the excitation light output and in the state of outputting the excitation light are required to be parallel to each other. By obtaining a propagation loss concerning B end which satisfies the above condition, a Raman gain generated in the entire transmission line is obtained. Furthermore, by dividing the Raman gain by the excitation light power, a Raman gain efficiency in the entire transmission line is obtained.

Figure 5:
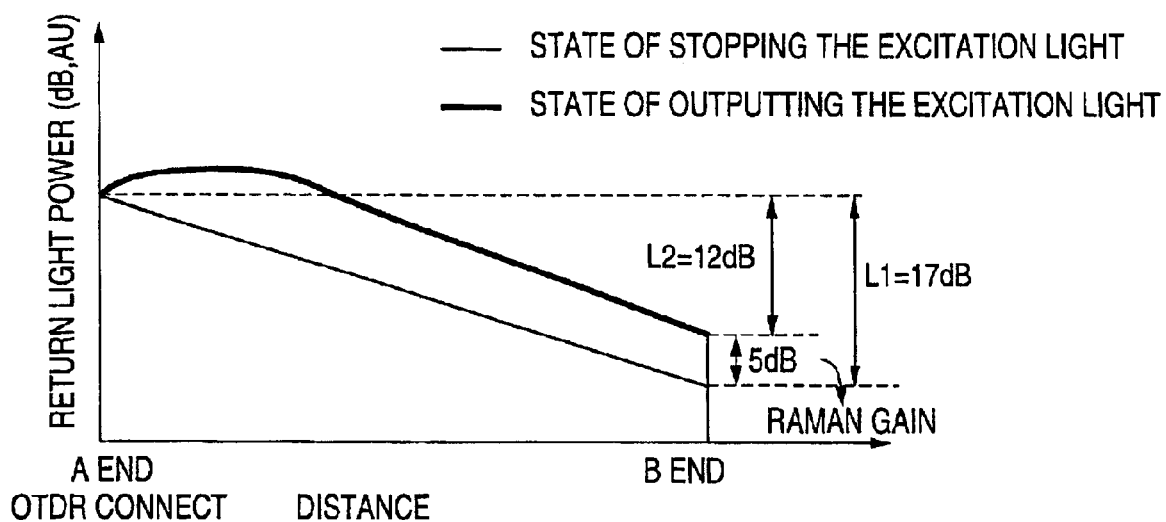
FIG. 5 is a graph showing a result (OTDR graph) obtained in a first embodiment of the present invention.
Figure 6:
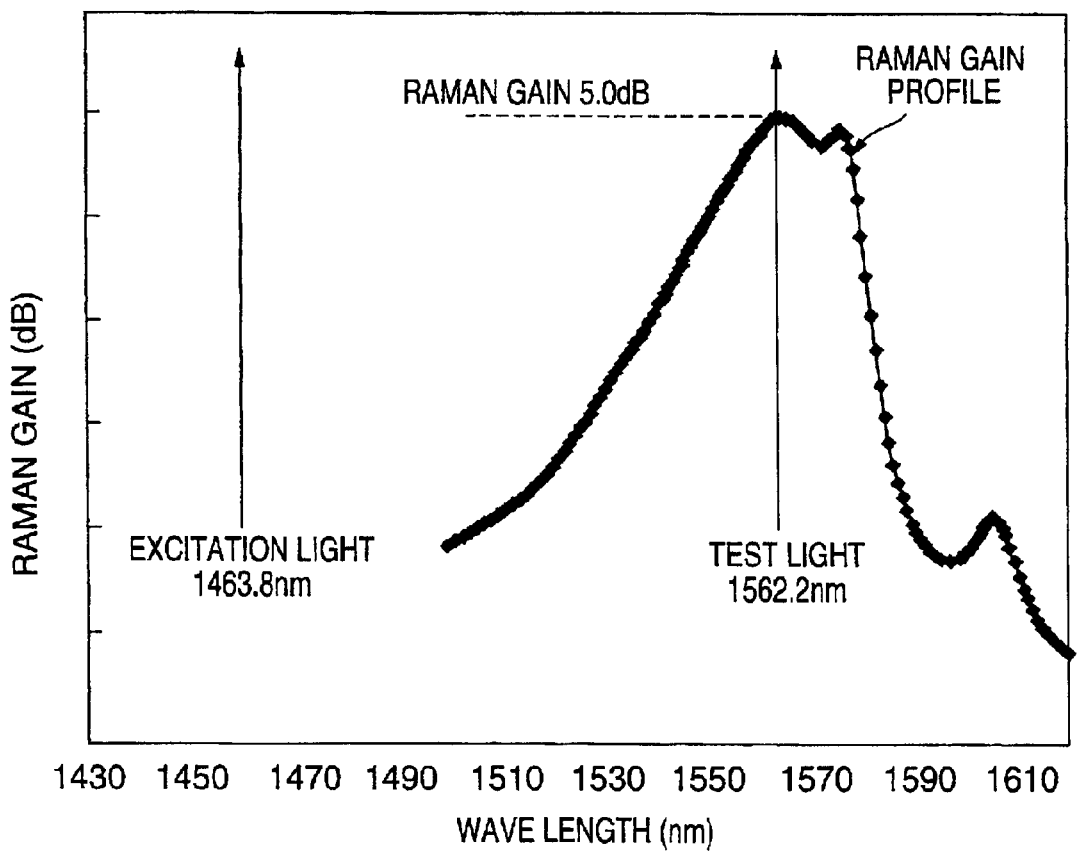
FIG. 6 is a graph showing an excitation light wavelength, test light wavelength and wavelength disposition in a gain profile of the first embodiment of the present invention.

When the OTDR graphs in the state of stopping the excitation light output and in the state of outputting the excitation light are not parallel to each other at B end, the excitation light power may be reduced until the graphs become parallel to each other. The followings are used in the embodiment: a single mode fiber (SMF) of 80 km as the transmission line fiber; the excitation light having a wavelength of 1463.83 nm; the test light having a wavelength of 1562.2 nm, which is lower in frequency by 13 THz than the excitation light; the excitation light output power set at 166 mW. As a result, as shown in an OTDR graph of FIG. 5, L1 is equal to 17 dB and L2 is equal to 12 dB, thus obtaining a Raman gain of 5.0 dB (L2−L1). This Raman gain is divided by the excitation light power, thus obtaining a Raman gain efficiency of 30.1 dB/W. A graph of FIG. 6 shows a relation among the excitation light wavelength, the test light wavelength and a Raman gain profile in the embodiment. In the graph of FIG. 6, with respect to the excitation light, the test light wavelength is located at the peak of the Raman gain profile.

Although the spectral width of the test light is set to 1 nm in the embodiment, application of any other spectral widths is also effective. However, if the spectral width is too narrow, OTDR measurement becomes unstable. Thus, a condition is set for the spectral width that the spectral width should be wide to the extent as not to make OTDR measurement unstable and should be sufficiently narrow with respect to cycles of variations in the Raman gain profile.

For the test light source of the embodiment, as long as the foregoing condition for the spectral width can be realized, a distributed feedback (DFB) laser and a wavelength variable laser are applicable. Moreover, for the passband of the wavelength filter 116, different passbands other than 1 nm are also applicable, as long as the ASE can be sufficiently removed without cutting off the spectrum of the test light.

Other than the above, for the type of the wavelength filter 116, filters of the following types are applicable in the embodiment: a Di-electric type, a Grating type, a Fabry-Perot type, a Mach-Zehnder interferometer type and the like.

Furthermore, for the optical attenuator 115, the Mach-Zehnder interferometer type, the Di-electric type, a LN type and a LBO type are also applicable.

For the excitation light source, a Fabry-Perot laser with a wavelength narrowed by fiber grating, a wavelength variable laser capable of outputting a sufficient power are applicable.

Second Embodiment

Figure 7:
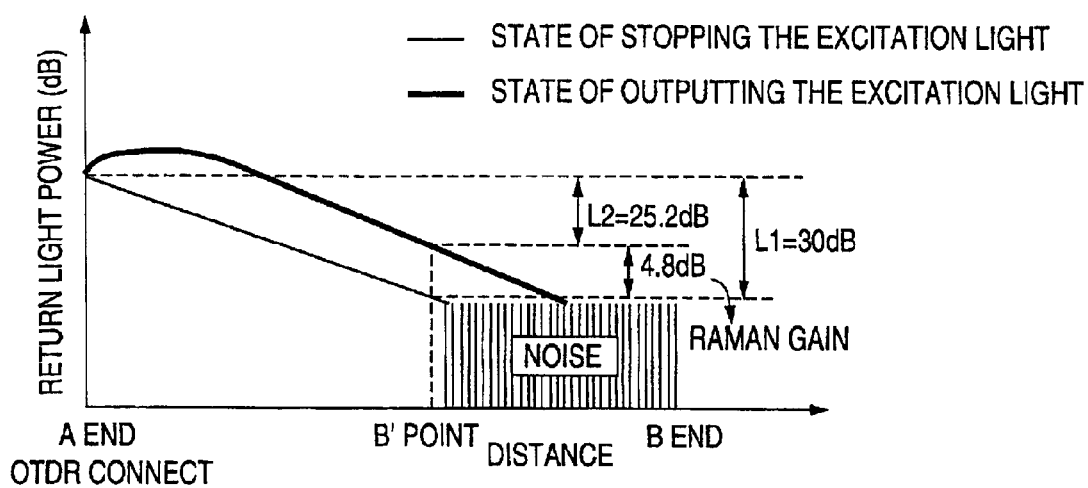
FIG. 7 is a graph showing a result (OTDR graph) obtained in a second embodiment of the present invention.

Next, description will be made for a second embodiment of the present invention. In the foregoing first embodiment, the Raman gain efficiency is obtained by use of the propagation loss detected from the return light generated in short of the vicinity of B end of the transmission line. However, there is a case, as shown in FIG. 7, where B end cannot be detected due to noise in a transmission line having a large loss in a test light wavelength. In such a case, a gain efficiency can be obtained based on return light generated at a point (B' point of FIG. 7) which is not buried in the noise. However, a significant attenuation of an excitation light power at B' point leads to generation of no Raman gain. In otherwords, OTDR graphs in a state of stopping an excitation light output and in a state of outputting the excitation light are required to be parallel to each other. When the OTDR graphs in the state of stopping the excitation light output and in the state of outputting the excitation light are not parallel to each other at B' point, the excitation light power may be reduced until the graphs become parallel to each other.

FIG. 7 shows an OTDR graph in the case of measuring a SMF in which a propagation loss of a test light wavelength from A end to B end is 40 dB, by use of an OTDR device capable of measuring return light up to the one generated at a point where a propagation loss is 30 dB. In the embodiment, similarly to the first embodiment, excitation light having a wavelength of 1463.83 nm and test light having a wavelength of 1562.2 nm, which is lower in frequency by 13 THz than the excitation light, are used. An excitation light output power is set at 166 mW. When a propagation loss up to B' point in the state of stopping the excitation light is set as L'1 and a propagation loss up to B' point in the state of outputting the excitation light is set as L'2, as shown in FIG. 7, L'1 is equal to 30 dB and L'2 is equal to 25.2 dB. Accordingly, a Raman gain of 4.8 dB is obtained. This Raman gain is divided by the excitation light power, thus obtaining a Raman gain efficiency of 28.9 dB/W.

Third Embodiment

Figure 8:
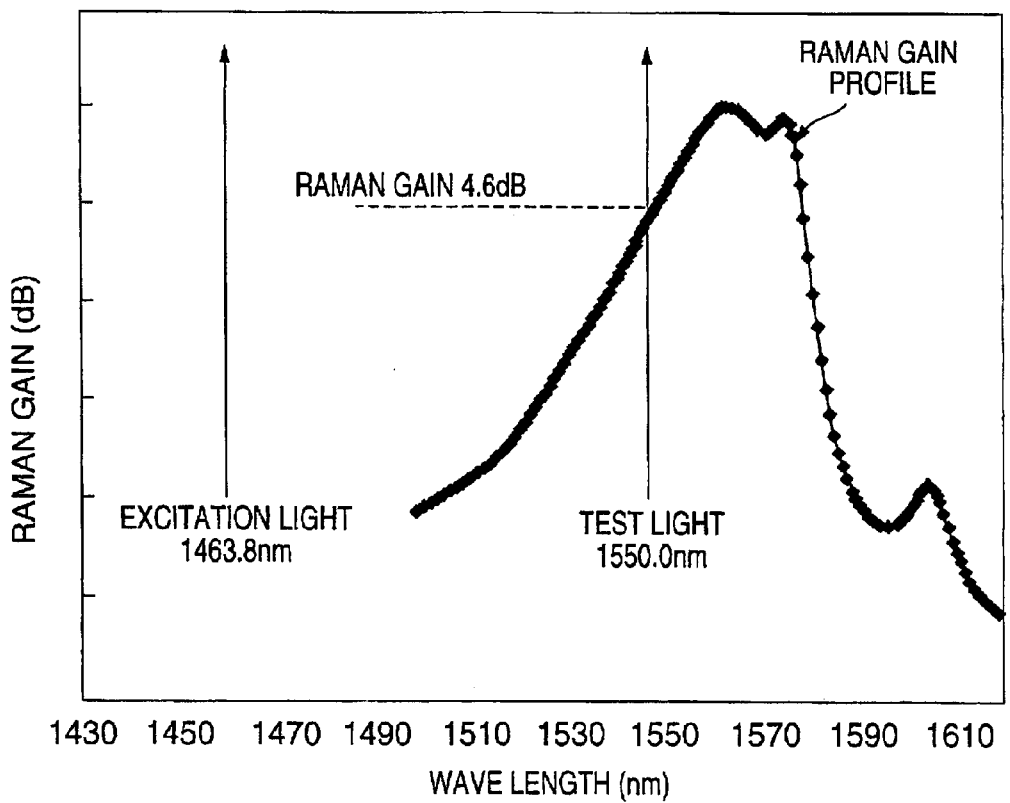
FIG. 8 is a graph showing an excitation light wavelength, test light wavelength and wavelength disposition in a gain profile of a third embodiment of the present invention.

Description will be made for a third embodiment of the present invention. The first embodiment showed the Raman gain efficiency in the case where the test light is lower in frequency than the excitation light by 13 THz. However, not being limited to the above, a Raman gain efficiency can be measured regarding other wavelength intervals. For example, in the same SMF as that of the first embodiment, when a test light wavelength of 1550.0 nm and an excitation light wavelength of 1463.8 nm are used and an excitation light output power is set to 166 mW, a Raman gain of 4.6 dB and a Raman gain efficiency of 27.7 dB/W are obtained. FIG. 8 shows a relation among the excitation light wavelength, the test light wavelength and a Raman gain profile in the embodiment.

Fourth Embodiment

Figure 9:
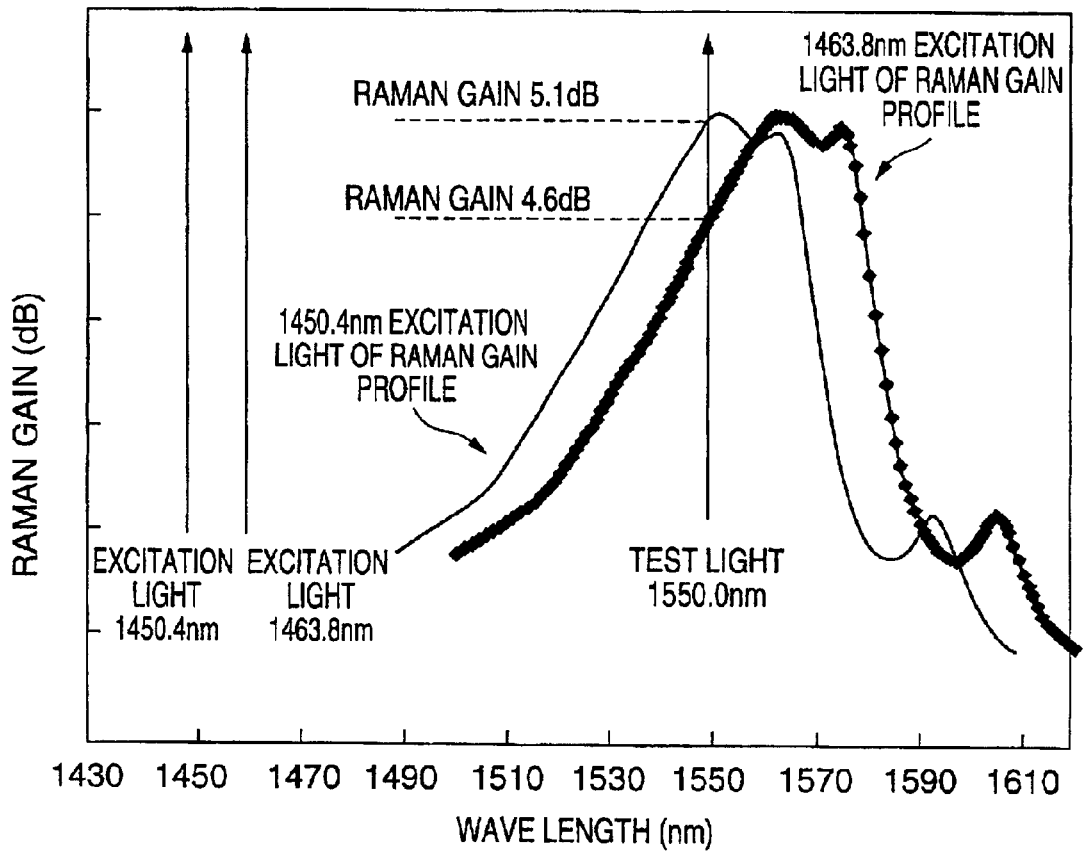
FIG. 9 is a graph showing an excitation light wavelength, test light wavelength and wavelength disposition in a gain profile of a fourth embodiment of the present invention.

Next, description will be made hereinbelow for a fourth embodiment of the present invention. In the embodiment, Raman gain efficiencies are measured with respect to plural types of excitation light wavelengths by use of a single-wavelength test light. For example, in the same SMF as that of the first embodiment, when a test light wavelength of 1550.0 nm and an excitation light wavelength of 1463.8 nm are used and an excitation light output power is set to 166 mW, a Raman gain of 4.6 dB and a Raman gain efficiency of 27.7 dB/W are obtained. Similarly, when a test light wavelength of 1550.0 nm and an excitation light wavelength of 1450.4 nm are used and an excitation light output power is set to 166 mW, a Raman gain of 5.1 dB and a Raman gain efficiency of 30.7 dB/W are obtained. As a matter of course, depending on selection of the test light wavelength, it is also possible to measure Raman gain efficiencies with respect to three or more excitation light wavelengths by use of a single test light wavelength. FIG. 9 shows relations among the excitation light wavelengths, the test light wavelength and Raman gain profiles in the embodiment.

Fifth Embodiment

Figure 10:
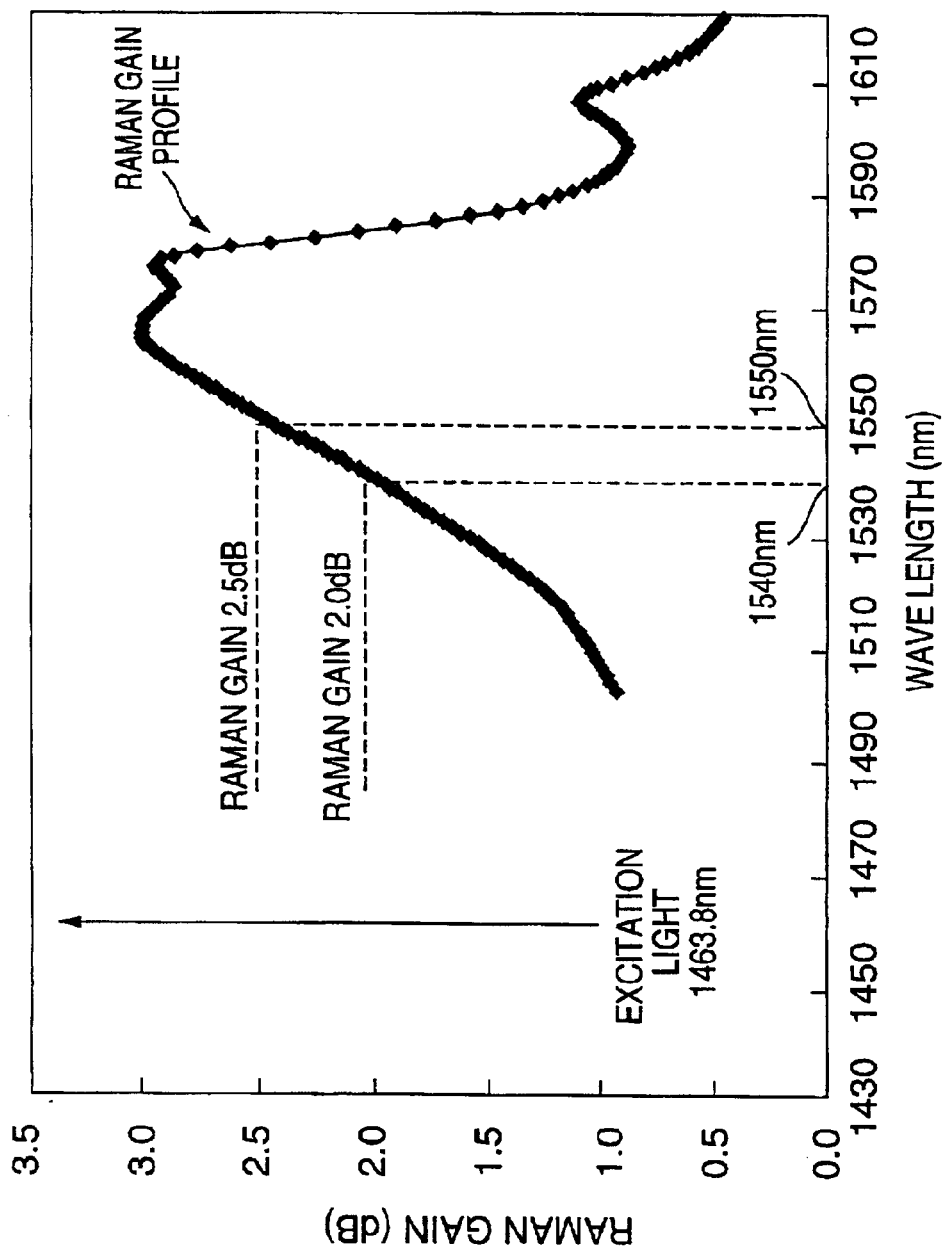
FIG. 10 is a graph showing an excitation light wavelength, test light wavelength and wavelength disposition of a gain profile of a fifth embodiment of the present invention.

Description will be made hereinbelow for a fifth embodiment of the present invention. As shown in FIG. 10, when a Raman gain profile has been obtained with respect to a certain excitation light wavelength, based on a Raman gain efficiency with respect to test light, a Raman gain efficiency of test light having a different wavelength can be calculated. FIG. 10 shows a Raman gain profile with respect to an excitation light wavelength of 1463.8 nm in a SMF. Although the absolute value of the Raman gain profile is varied based on an excitation light output power, shapes of the profile are inherent in fiber types. In the Raman gain profile of FIG. 10, a Raman gain of 2.5 dB is obtained when the test light wavelength is 1550 nm, and a Raman gain of 2.0 dB is obtained when the test light wavelength is 1540 nm. It is determined, from the shape of this Raman gain profile, that a Raman gain efficiency of the test light wavelength of 1540 nm is one obtained by multiplying a Raman gain efficiency of the test light wavelength of 1550 nm by 0.8 (2÷2.5). Therefore, when the excitation light wavelength is set to 1463.8 nm in the same SMF as the first embodiment, it is apparent from the result of the third embodiment that the Raman gain efficiency in the case of the test light wavelength of 1550 nm is 27.7 dB/W. The Raman gain efficiency in the case of the test light wavelength of 1540 nm can be calculated as 22.2 (7.7×0.8) dB/W.

Sixth Embodiment

Description will be made herein below for a sixth embodiment of the present invention. By use of a single test light wavelength, a Raman gain efficiency at a wavelength lower in frequency than respective wavelengths of a plurality of excitation lights by 13 THz, that is, at a peak wavelength of a Raman gain profile can be obtained. Hereinafter, the peak wavelength of the Raman gain profile will be called a Raman gain peak wavelength. According to the technique of the fourth embodiment, Raman gain efficiencies with respect to the plurality of excitation light wavelengths by use of the single test light wavelength are measured. Based on the measurement result, a Raman gain efficiency at the Raman gain peak wavelength of each excitation light wavelength is calculated according to the technique of the fifth embodiment. As a matter of course, the Raman gain efficiency obtained by the technique of the embodiment is not limited to the one obtained at the Raman gain peak wavelength of each excitation light wavelength. According to the technique of the embodiment, it is possible to obtain a Raman gain efficiency at an arbitrary wavelength within the Raman gain profile which has been previously obtained.

For the optical fiber of the transmission line used in the foregoing embodiments, a non zero dispersion fiber (DSF), a 1.55 μm-dispersion shifted fiber (DSF) and the like are applicable besides the SMF.

By use of the Raman gain and Raman gain efficiency obtained by the method of measuring a Raman gain according to each of the foregoing embodiments, a constitution for stabilizing values of the Raman gain and the Raman gain efficiency is shown in FIG. 3. In other words, in the constitution of FIG. 3, an output signal of the OTDR 110 is supplied to a control circuit 200, and the value of the inputted Raman gain or the inputted Raman gain efficiency is compared with a reference value in the control circuit 200. The obtained comparison result is set as an error signal, and a control signal such as to reduce the error signal is generated and outputted. The control signal is supplied to the excitation light source 140, and an optical power according to the control signal is outputted from the excitation light source 140. With the above-described constitution, the Raman gain is stabilized at a predetermined value.

According to the method and apparatus for measuring a Raman gain, the method and apparatus for controlling a Raman gain and the Raman amplifier of the present invention, the following effects can be obtained. Specifically, it is made possible to measure a Raman gain efficiency only by an operation at one end of a transmission line. As a result, even in the case where a concurrent operation at both ends of the transmission line is hard to be conducted because relay stations at both ends of the transmission line are apart from each other by several 10 km, the Raman gain efficiency in the transmission line can be obtained.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A Raman amplifying apparatus, comprising:

a first outputting means for outputting an excitation light to an optical fiber;

a measuring means for measuring a Raman gain using return light attributable to back scattering in a signal band outputted from the optical fiber;

a controlling means for controlling a power of the excitation light based on a result of the measuring means;

a test light for providing a test light of a wavelength different from the excitation light; and a wavelength division multiplex coupler arranged to multiplex the excitation light and the test light wavelength going to the optical fiber and to demultiplex the return light coming from the optical fiber, wherein, the first outputting means comprises an excitation light source for providing the excitation light to the coupler;

the measuring means comprises wavelength filter connected to the coupler, an optical attenuator connected to the filter, and an optical time domain reflectometry device connected to the attenuator, and the controlling means receives a signal from the optical time domain reflectometry device and is connected to the excitation light source for controlling the power of the excitation light.

2. A Raman amplifying apparatus, comprising:

a first outputting circuit that outputs an excitation light to an optical fiber;

a measuring circuit that measures a Raman gain using return light attributable to back scattering in a signal band outputted from the optical fiber;

a controller that controls a power of the excitation light based on a result of the measured Raman gain;

a test light to provide a test light of a wavelength different from the excitation light; and a wavelength division multiplex coupler arranged to multiplex the excitation light and the test light wavelength going to the optical fiber and to demultiplex the return light coming from the optical fiber, wherein, the first outputting circuit comprises an excitation light source for providing the excitation light to the coupler;

the measuring circuit comprises wavelength filter connected to the coupler, an optical attenuator connected to the filter, and an optical time domain reflectometry device connected to the attenuator, and the controller receives a signal from the optical time domain reflectometry device and is connected to the excitation light source for controlling the power of the excitation light.

* * * * *